United States Patent [19]

Monk et al.

[11] Patent Number: 5,235,556
[45] Date of Patent: Aug. 10, 1993

[54] INTERPOLATION OF ALIASED SEISMIC TRACES

[75] Inventors: David J. Monk, Sugarland; Robert G. McBeath, Richardson, both of Tex.; Cameron B. Wason, Chevron ISLD, Australia

[73] Assignee: Halliburton Geophysical Services Inc., Houston, Tex.

[21] Appl. No.: 805,397

[22] Filed: Jan. 10, 1992

[51] Int. Cl.⁵ .............................................. G01V 1/36
[52] U.S. Cl. ......................................... 367/63; 367/73
[58] Field of Search ............................ 367/38, 63, 73; 364/421

[56] References Cited

U.S. PATENT DOCUMENTS

| | | | |
|---|---|---|---|
| 4,594,693 | 6/1986 | Pann et al. | 367/43 |
| 4,887,244 | 12/1989 | Willis et al. | 367/73 |
| 4,922,465 | 6/1990 | Pieprzak et al. | 367/38 |
| 4,964,098 | 10/1990 | Hornbostel | 367/73 |

OTHER PUBLICATIONS

Novotny, M. "Trace Interpolation by Slant-Stack Migration," Geophysical Prospecting, vol. 38, #8, Nov. 1990, pp. 833-851.
Seismic trace interpolation in the F-X domain, by S. Spitz, Jun. 1991, pp. 785-794.
Trace Interpolation in Seismic Data Processing, by V. Bardan, 1987, vol. 35, pp. 343-358.
Seismic Data Processing, by Ozdogan Yilmaz, Chapter 7.
The Role of Interpolation in Seismic Resolution, by G. King et al, 1984, pp. 766-767.
Reduction of Spatial Aliasing in the Presence of Crossing Events by Interpolation, by J. Raoult, pp. 761-763.

*Primary Examiner*—Ian J. Lobo
*Attorney, Agent, or Firm*—William J. Beard

[57] ABSTRACT

The present invention provides method of interpolating spatially aliased seismic data. This method produces high resolution interpolated data based on a locally planar model of reflection events using a two dimensional power diversity slant stack process that transforms the data from the t-x-y domain to t-xslope-yslope domain. The present invention further provides an improved technique for the 3D interpolation of aliased events and is applicable to the interpolation of 2D seismic data.

20 Claims, 5 Drawing Sheets

INTERPOLATION OF ALIASED SEISMIC TRACES

BACKGROUND OF THE INVENTION

1. Field of the Invention

The present invention relates to methods for interpolating seismic data wherein such methods account for spatially aliased events. Interpolation of spatially aliased events enables the generation of high resolution data in preparation for various multi-trace process and in particular for migration.

2. Description of the Prior Art

For many multi-trace seismic processing methods fine resolution digital data are required. Migration processing is an example of a multi-trace seismic process requiring such highly resolved digital data. In order to achieve sufficient resolution, seismic receivers, such as geophones, are generally spaced apart so as to achieve a sampling interval from between about 5 to about 25 meters. In some instances, the sampling interval can be as fine as 1 meter.

However, poor seismic processing results can be obtained when the sample interval selected is too large. For example, FIG. 1, is a schematic cross section of a geological formation A illustrating a plurality of seismic traces B recorded by discrete geophones (not shown). The geophones are spaced at sampling interval C. Each seismic trace B includes a plurality of reflection events D thereon. Ideally, each reflection event D correspond to a discrete interface E between geological strata. Upon continued analysis and processing of the seismic traces B, the geological dip or slope of the imaged formation might appear to proceed along line F—F and not along line G—G. Line G—G represents the true slope or dip of the geological formation D. The apparent slope of the geological formation D represented by line F—F results from spatially aliased seismic traces.

The occurrence of spatial aliasing between seismic traces is related to the sampling interval of the seismic receiver. In other words, tighter sampling intervals between seismic sensors produce greater resolution of steep sloping geological formations.

FIG. 2 illustrates the same geological formations with a tighter or finer sampling interval ($\frac{1}{4}$ C). Here, the true geological slope represented by line G—G is clearly apparent.

However, collecting data on a fine sampling interval in the field significantly adds to the cost of seismic data acquisition particularly in the case of three dimensional (3D) surveying. Some benefit can be obtained by interpolating coarsely sampled seismic data and more particularly, coarsely sampled spatially aliased seismic data.

In general, interpolation can be described as the determination of values at locations from near by values, wherein such determined values have not been measured or specified. In the case of coarsely sampled seismic traces, interpolation provides an unmeasured value, preferably a value consistent with a reflection event, between measured reflection event recorded by discrete seismic sensors. In this way, interpolation may reduce the cost of data acquisition by permitting larger sampling intervals yet providing data suitably formatted (data appearing to be sampled at finer intervals) for improved multi-trace processing. However, when the spacial aliasing occurs in seismic data, present interpolation techniques do not significantly improve the seismic processing result. The effect of multi-trace processing of spatially aliased seismic traces is illustrated in the article "Trace Interpolation In Seismic Data Processing" (V. Bardan, Geophysical Prospecting, 35, pp 343-358, 1987). In this article, migration of spatially aliased traces produces very poor results.

A number of interpolation techniques are available. The simplest of these is sinc interpolation. However this technique is ineffective on spatially aliased traces. Another technique (J. J. Raoult, Expanded Abstracts, SEG Convention, Atlanta, 1984, pp 761-763) searches multi-trace data in the t-x domain for the locally most coherent one or two dips, and interpolates amplitudes along the dip directions. The limitation of this method is that it only interpolates data on a line by line basis, typically the cross-line direction in a 3D survey. The ideal interpolation would use all of the data in the vicinity of the region being interpolated.

SUMMARY OF THE INVENTION

The present invention produces high resolution interpolated seismic traces based on a locally planar model of reflection events. The present invention further provides an improved technique for the 3D interpolation of aliased events and is also applicable to the interpolation of 2D seismic data. A key step of the process is a two dimensional power diversity slant stack process that transforms the data from t-x-y space to t-xslope-yslope space. Two dimensional power diversity slant stacking is describe in patent application Ser. No. 704,231, titled "Noise Attenuation Method" and is herein incorporated by reference in its entirety.

In this process each element of the summation along a slant direction is preweighted by the inverse of the local power of the trace. The result of this preweighting is to improve noise attenuation when the traces are noisy and to aid in rejecting data alignments that do not persist across the aperture of the data being analyzed.

The preferred present invention consists of three main steps. After processing raw seismic data to produce seismic traces, these seismic traces are examined to pick the dips of the reflection events in the inline and crossline directions in the first step. These dips will serve as the basis for controlling the x-slope and y-slope limits that must be retained in the slant stack domain to faithfully reproduce the traces.

The second step involves subdividing the volume of traces into overlapping blocks in x and y, and then performing a domain transformation of each block. The domain transformation is performed using a two dimensional power diversity slant stack. This transforms the trace data from the t-x-y domain to the t-xslope-yslope stack.

Power diversity slant stacking provides excellent mapping of planar dipping segments to a point in the two dimensional slant domain, even when the trace data is noisy. It also inhibits the mapping of partial planar dipping segments to this domain. Such partial alignments that do not exist across the full trace data aperture do not correspond to valid reflection phenomena and should not be interpolated.

During the second step, excessive dip noise can be muted from the traces. This process involves retaining only those xslope and yslope components in the trace data, as a function of time, that fall between the dip bounds that were identified in the first step. Restricting the dip range improves the quality of the interpolation by excluding event slopes, induced by noise in the trace data, that could not realistically occur.

The third step reconstructs the interpolated trace data using a two dimensional inverse slant stack without the diversity feature. The result is a high quality interpolated trace data block. Once all the trace data blocks have been interpolated, the output produced, which may be selectively displayed, is composited from the interpolations performed on each block.

DESCRIPTION OF THE PREFERRED EMBODIMENT

Figure 1:
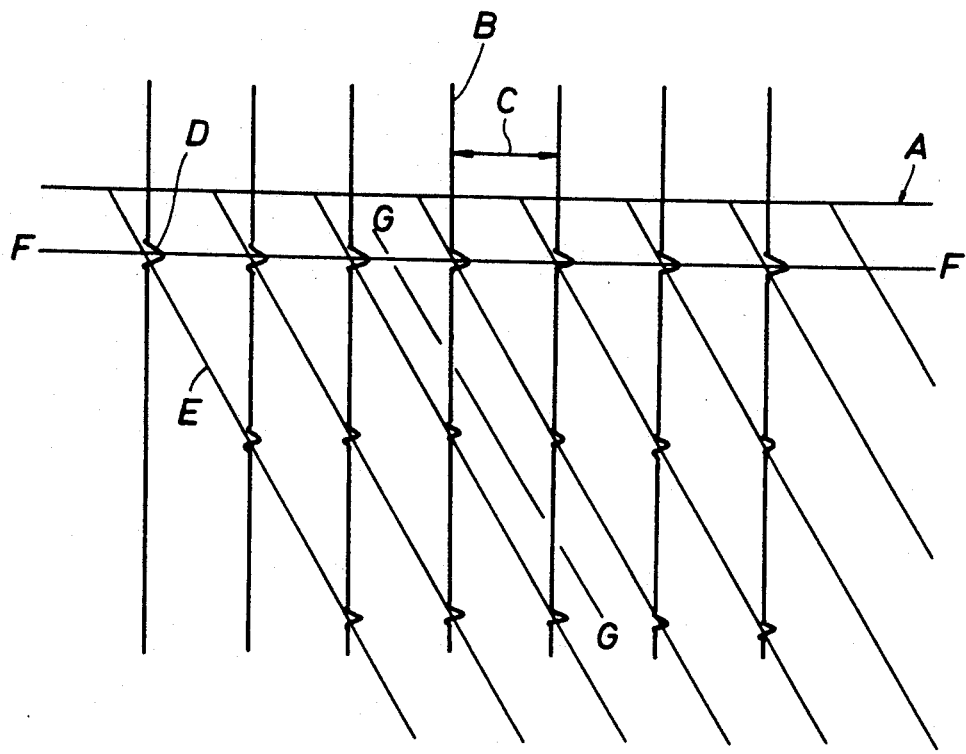
FIG. 1 is a vertical cross section of a geological formation illustrating a series of seismic traces imaging said formation and recorded at sampling interval C.
Figure 2:
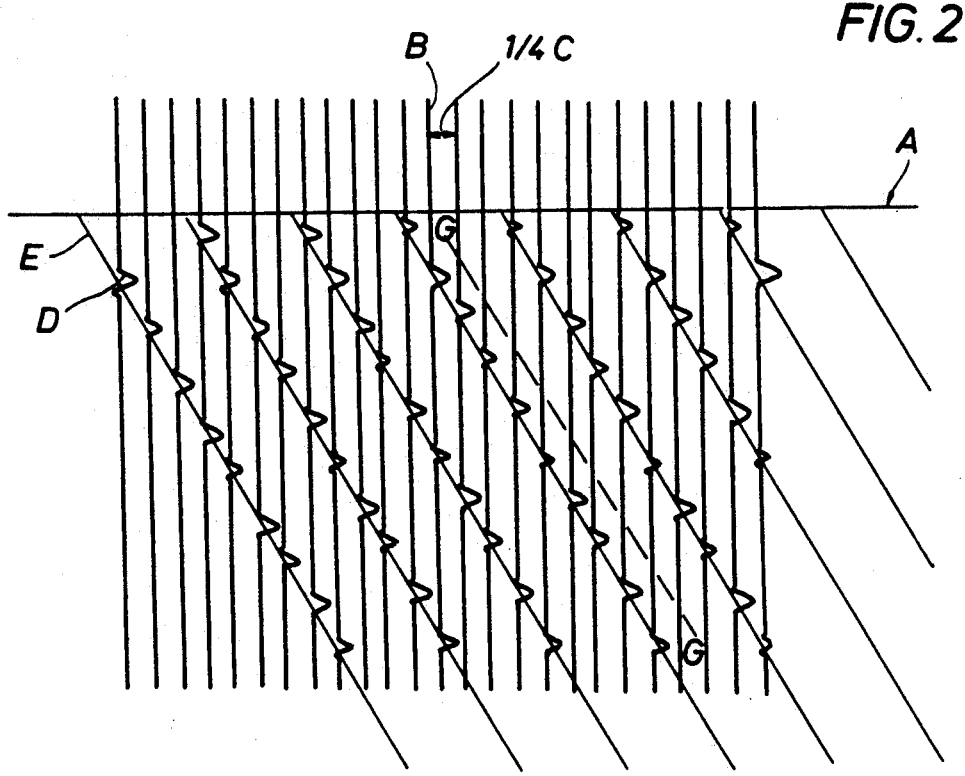
FIG. 2 is the vertical cross section of FIG. 1 illustrating a series of seismic traces imaging said formation and recorded at sampling interval ½ C.
Figure 3:
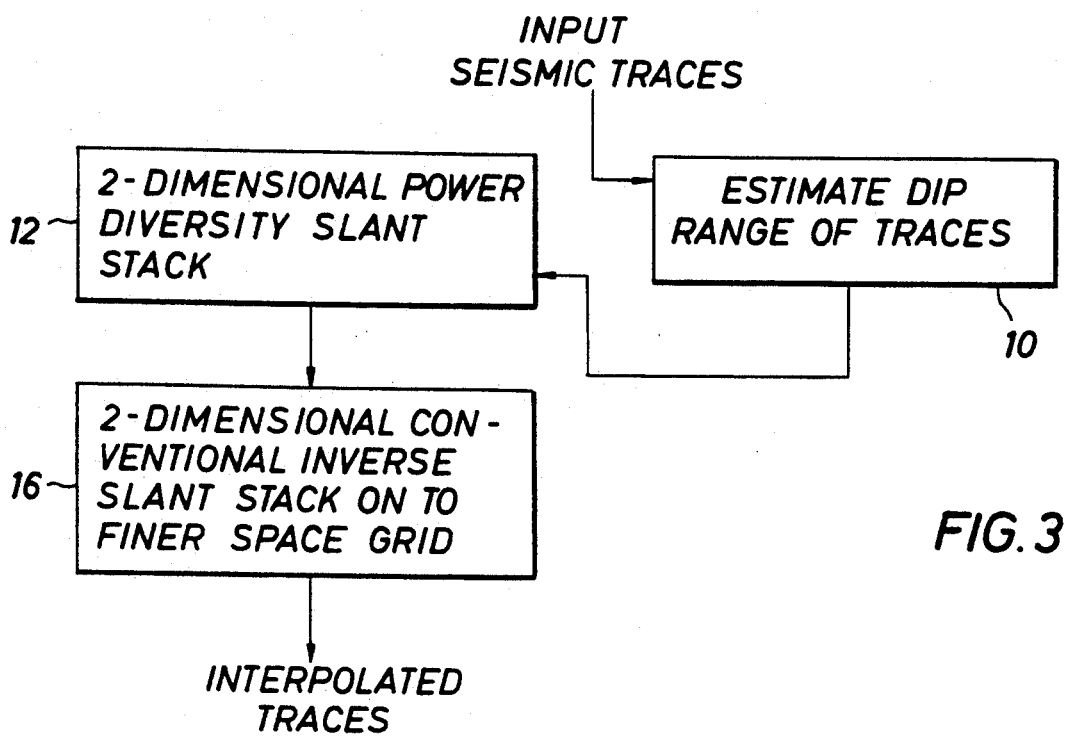
FIG. 3 is a schematic large scale flowchart illustration of the overall method of the present invention.

The interpolation method of the present invention is achieved in the three stages illustrated in FIG. 3. The first stage 10 estimates the dip ranges incorporated in the input seismic traces as a function of time and space. The dip range information (or dip range data base) may be used in step two (12) to mute excessive dip "noise" from the trace data. In the second stage 12, a two-dimensional power diversity slant stack is performed to transform the date into the x-slope/y-slope domain. In step 3, (block 16 of FIG. 3) the trace data is conventionally two-dimensional inverse slant stacked onto a fine x-y grid.

Figure 4:
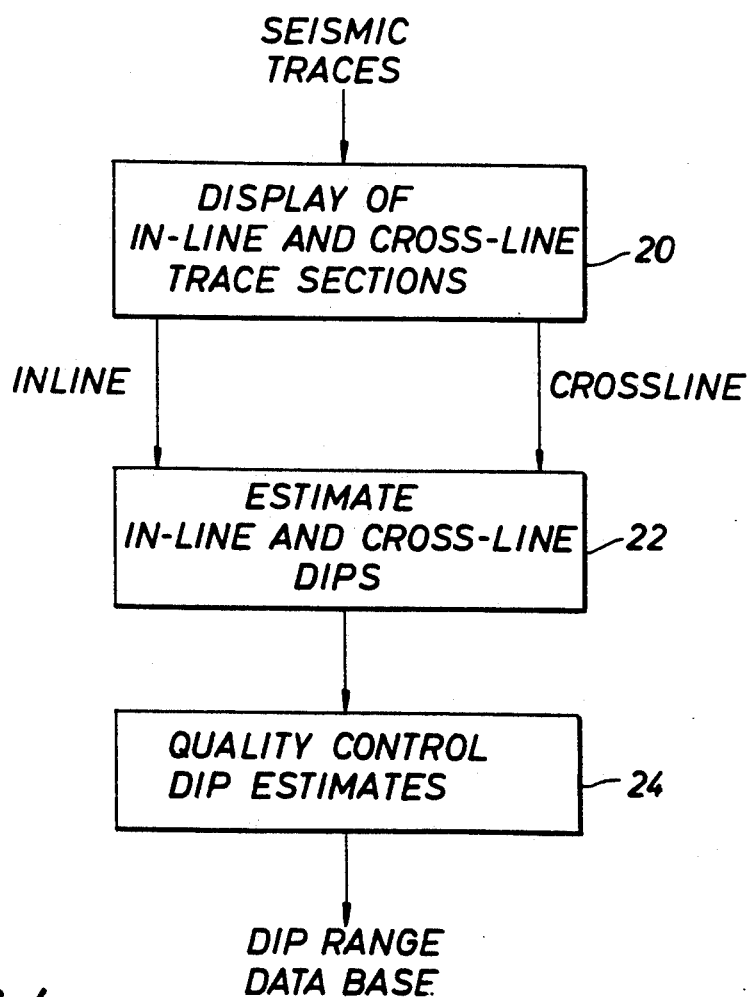
FIG. 4 is a schematic flowchart illustrating the step of generating a dip data base.

FIG. 4 shows the steps involved in estimating the dip range (FIG. 3, Block 10). The in-line seismic traces are displayed in 20 and interactively interpreted, either manually or in a manual/automatic mode, to determine the maximum positive and negative dips represented by the traces in the in-line direction. These estimates are made as a function of time on each line, and as a function of distance down the line. Once all of the lines have been interpreted, the process is repeated in the cross-line direction.

The in-line and cross-line dip estimates are then checked for inconsistent dips (24) to ensure the integrity of the dip data. Inconsistent results are edited and the dip ranges are recorded for use in step 2 (FIG. 5) in which the excess dip noise in the traces are muted. The process for generating two-dimensional diversity power slant stack traces is shown in FIG. 5.

Figure 5:
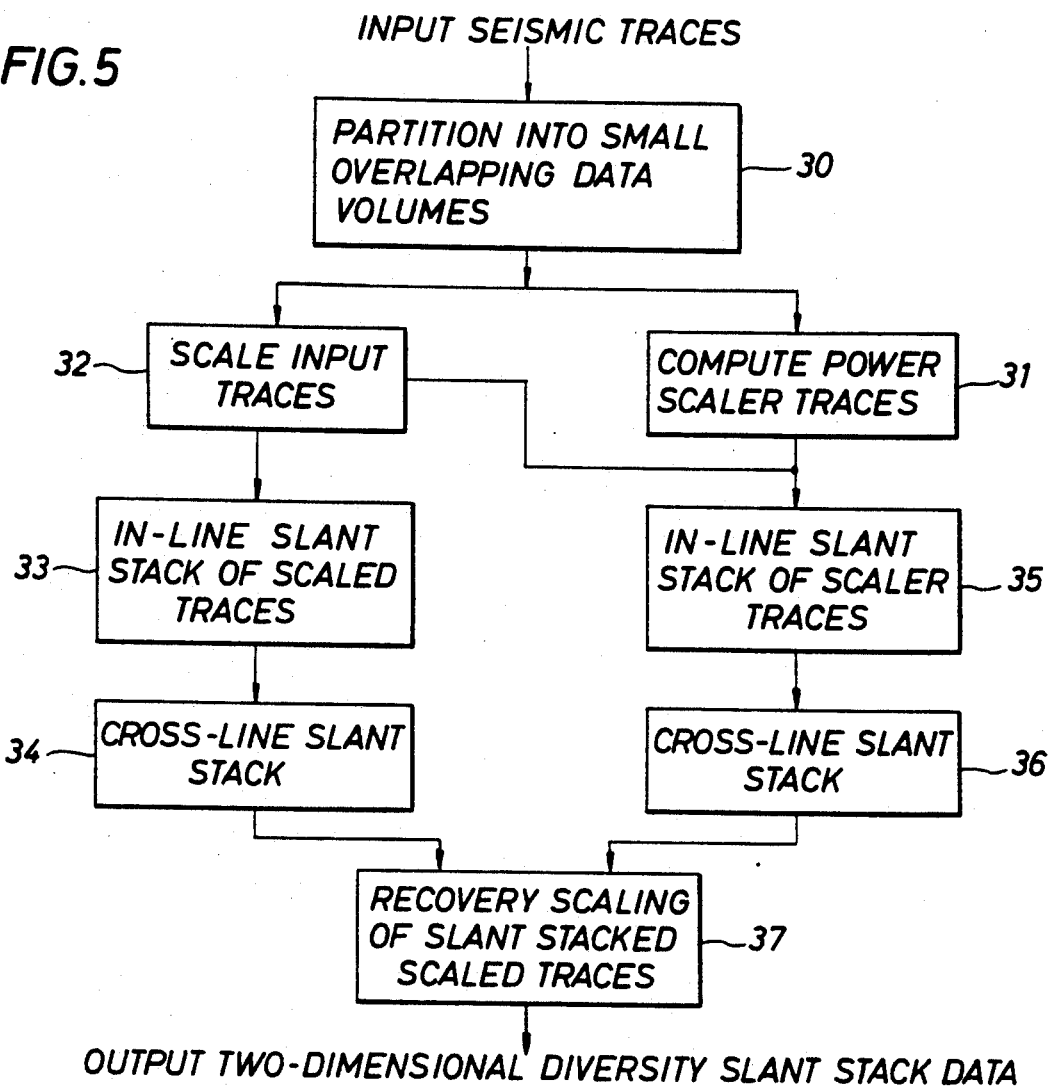
FIG. 5 is a schematic flowchart illustrating the step of generating the 2 dimensional diversity power slant stack.

Referring now to FIG. 5, the input seismic traces are selectively partitioned (30) into small overlapping trace data volumes. Preferably, trace data volumes may be selected to be small enough such that the true reflection data is coherent across the whole of the volume. This will usually imply a small volume such as 4 inline traces by 4 crossline traces. The overlap will generally imply complete overlap except for one set of inline, or one set of crossline traces. Each trace data volume is then processed independently.

The principle of the diversity power slant stack process is to perform the slant stack on the traces after they have been scaled by the reciprocal of the local power in the trace. This reciprocal of the local power in the trace—the power scaler trace—is computed in block 31. This is typically computed as $$SCLR(T) = 1/(APWR(T) + C)$$

where APWR(T) is the local average power in the trace and C is a constant. Selecting the value of C from about 0.1% to about 10.0% and preferably about 1% of the average value of APWR(T) computed for all points ensures that the power scaler trace does not get too large when APWR(T) is small. The local average power can be computed as a filtered value of the instantaneous power in the trace.

Each trace in the data volume is scaled (32) by its corresponding scaler trace on a point by point basis. This scaling is a multiplication of the input trace by its corresponding scaler trace. The output is referred to as the scaled traces. Because the scaler trace is the reciprocal of the local power in the trace, a trace segment with a large noise burst is scaled down. Consequently it will not contribute significantly to the summation in block 33. Additionally, the scaler trace at this time instant is very small and it will not contribute significantly to the summation of the scalers in 35.

Both the scaled traces and the scaler traces are now identically slant stacked in the in-line direction in blocks 33 and 35, and in the cross-line direction in blocks 34 and 36. In blocks 33 and 35, the slant stack for a given slope p is computed by performing the following summation over all traces in the data block for this one time:

$$ST(\tau, p, y) = \Sigma D(\tau + px, x, y)$$

Each trace is time advanced by px and the traces summed to produce the output trace $ST(\tau, p, y)$ for this line y. The range of slopes p must be adequate to cover the range of in-line slopes in the dip data base for this location and time. The increment $\Delta p$ required to support all signals in the range is given by:

$$p = 2\Delta T/(N\Delta x)$$

where
$\Delta T$ = time sample interval of the trace data
$\Delta x$ = distance between traces
N = number of traces in the inline direction within the data block Once all of the scaled traces and the scaler traces have been stacked in-line, a similar summation is performed cross-line, in blocks 34 and 36, for each cross-line slope q. The cross-line slant stack for a given slope q is computed by performing the following summation over all of the p traces for one cross line y:

$$SST(\tau, p, q) = \Sigma ST(\tau + qy, p, y)$$

The output time-xslope-yslope data block is computed in 37. It is obtained by dividing the two-dimensional slant stacks of the scaled traces by the two-dimensional slant stacks of the scaler traces. This is done on a point by point basis at common values of p, q and τ.

As previously discussed, excessive dip noise present in the out put of step two (FIG. 5) may be muted using the dip range information (FIG. 3, Block 10). Muting is accomplished by computing stacks over the range of the in-line and cross-line dips as indicated by the dip range data base.

Muting may also be performed as a separate step in the process of the present invention. In this instance, muting attenuates those trace data components at a given time that exceed the xslope (p) and yslope (q) that is specified in the dip range data base as being adequate to support the trace data.

Figure 6:
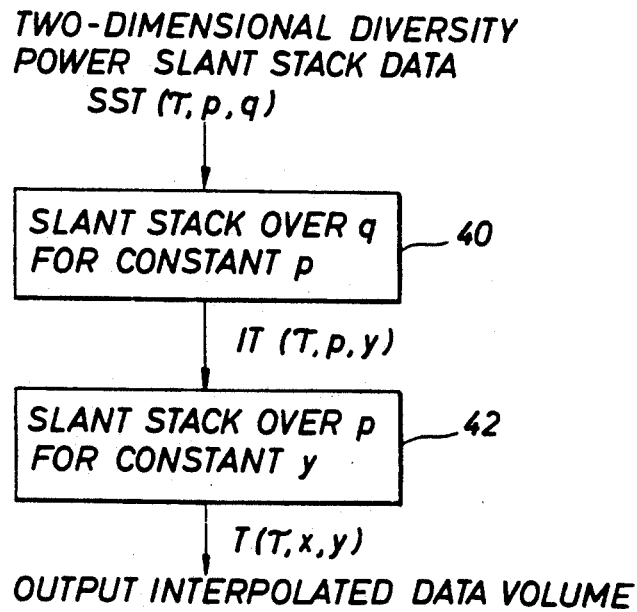
FIG. 6 is a schematic flow illustrating the steps of the inverse slant stack and interpolation.

The final step of the process is the two dimensional inverse slant stack, block 16 in FIG. 3, and shown in detail in FIG. 6. The input to this process is preferably the muted two-dimensional diversity power slant stack traces. This inverse slant stack process is performed according to the following relationship:

$$1T(\tau, p, y) = \Sigma SST(\tau - qy, p, q)$$

where the summation is over all the values of cross line dip (q) for a given inline dip (p), as shown in step 40. Interpolation in the y direction is achieved by specifying a sufficiently fine y grid, and upon computing the $1T(\tau, p, y)$ for each y.

The inverse slant stack process is then performed in 42 for the in-line direction. This slant stack process is performed according to the relationship:

$$T(\tau, x, y) = \Sigma 1T(\tau - px, p, y)$$

where the summation now is over all p values for a given y. Again, interpolation in the in-line direction is achieved by computing the output $T(\tau, x, y)$ on a sufficiently fine x grid.

Figure 7:
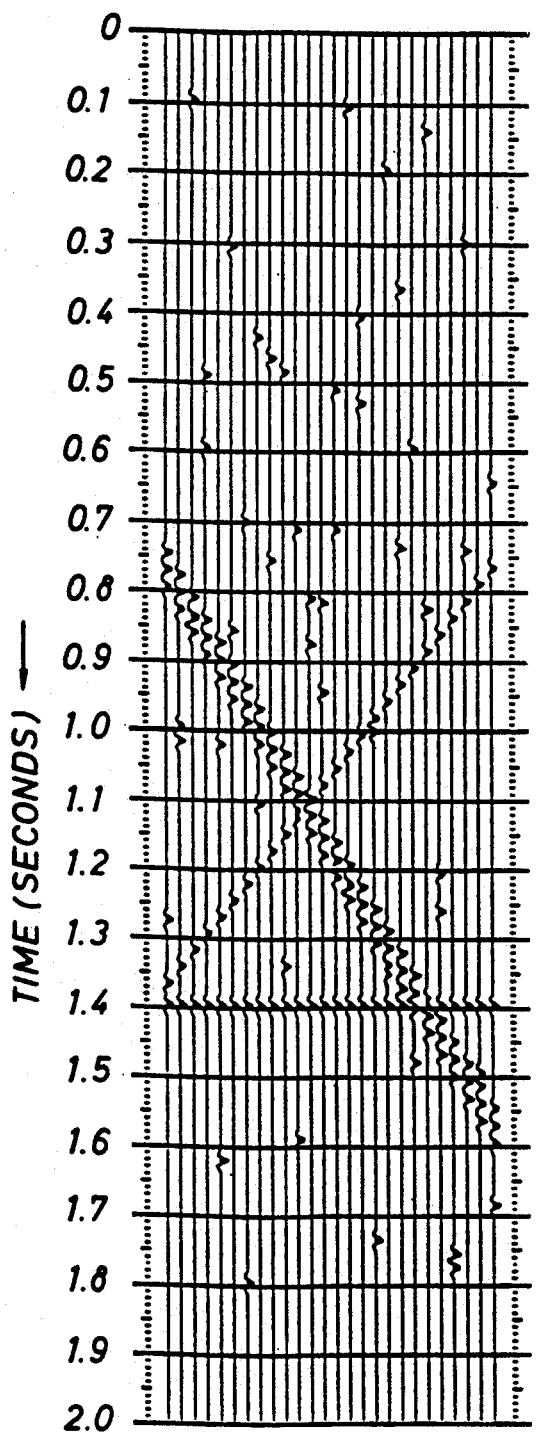
FIG. 7 is an illustration of un-interpolated 2 dimensional traces.
Figure 8A:
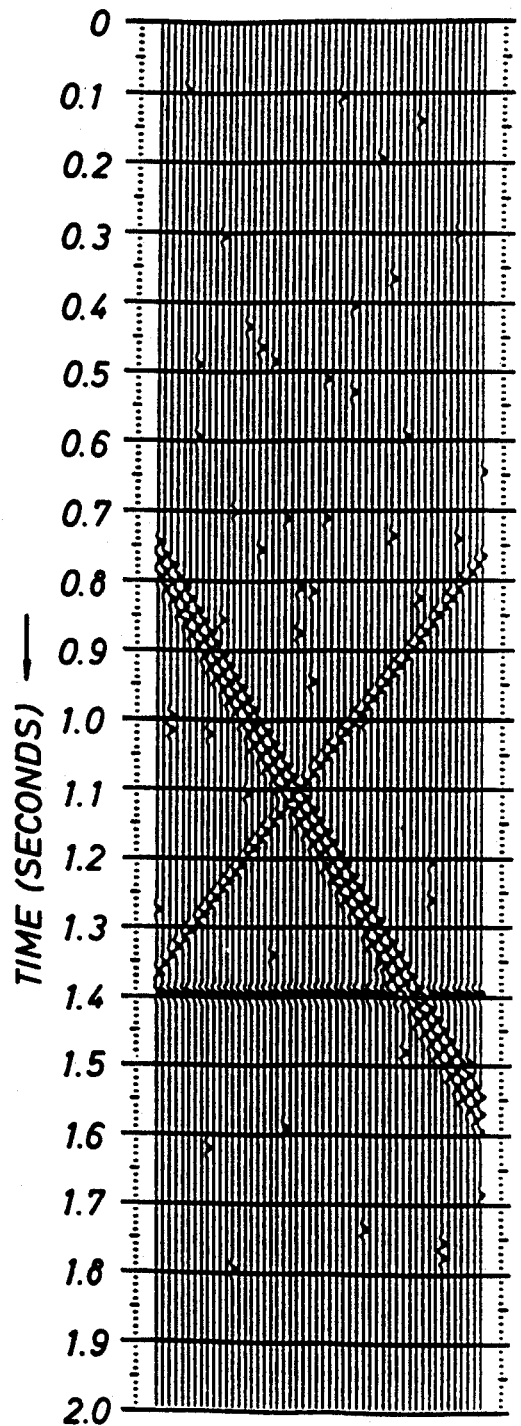
FIG. 8(a) illustrates the results of a 2:1 interpolation of the data in FIG. 7 using the process of the present invention.
Figure 8B:
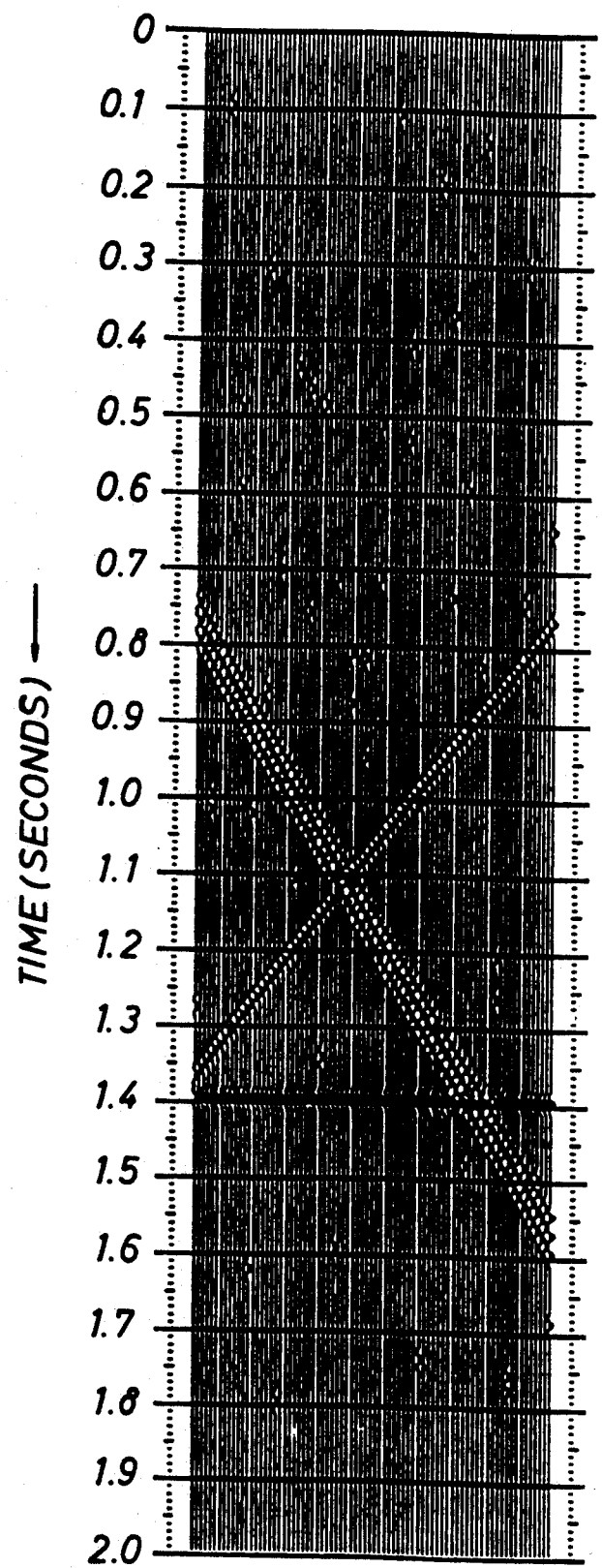
FIG. 8(b) illustrates the results of a 3:1 interpolation of the data in FIG. 7 using the process of the present invention.

FIG. 7 illustrates a 2-dimensional input record that is to be interpolated using the method of the present invention. The trace data on this record is aliased and one event crosses the other three. FIGS. 8(a) and 8(b) show the result after interpolation using themethod of this invention. FIG. 8(a) illustrates a 2:1 interpolation and FIG. 8(b) illustrates a 3:1 interpolation. In both FIGS. 8(a) and 8(b), all events are well interpolated including the crossing event.

What is claimed is:

1. A method of interpolating seismic traces comprising the steps of:
    (a) processing seismic data to produce input seismic traces;
    (b) transforming the input seismic traces from the x, y, and time domain into the x-slope, y-slope and time domain (domains) by using a two dimensional power diversity slant stack; and
    (c) transforming the product of step (b) back into the x, y, and time domain using an inverse slant stack.

2. The method of claim 1 wherein the seismic data is further defined as three-dimensional seismic data.

3. The method of claim 1 wherein the inverse slant stack of step (c) is further defined as a two-dimensional inverse slant stack.

4. The method of claim 1 wherein step (b) comprises:
    partitioning the input seismic traces into at least one trace data volume;
    scaling each input seismic trace in said data volume by the reciprocal of the local power in said trace to produce a scaler trace;
    scaling each input seismic trace by the corresponding scaler trace to produce a scaled trace;
    slant stacking in an in-line and cross-line direction at least two scaled traces and at least two scaler traces; and
    determining an output time-xslope-yslope by dividing on a point by point basis at least one slant stack of the scaled traces by the slant stack of the scaler traces.

5. The method of claim 1 further including the step of estimating trace dip ranges so as to generate a dip range data base.

6. The method of claim 5 further including the step of muting from the x-slope and y-slope domains those portions of the product of step (b) not present in the dip range data base, and wherein the muted product of step (b) is transformed in step (c).

7. The method of claim 5 wherein the estimating step is further defined by estimating the trace dip range of each trace in an in-line and cross-line direction.

8. The method of claim 5 wherein the estimating step is further defined by estimating the trace dip range of each trace in a time and space variant manner and wherein a time and space variant dip range data base is generated.

9. The method of claim 1 further including the step of displaying the product of step (c).

10. A method of interpolating seismic traces comprising the steps of:
    (a) processing seismic data to produce input seismic traces in a space and time domain;
    (b) transforming the input seismic traces from the space and time domain into a slope and time domain using a power diversity slant stack; and
    (b) transforming the product of step (b) from the slope and time domain back into the space and time domain so as to produce interpolated data using an inverse slant stack.

11. The method of claim 10 wherein the seismic data is further defined as two-dimensional seismic data.

12. The method of claim 10 wherein the slope domain is further defined as the x-slope domain.

13. The method of claim 10 wherein step (b) comprises:
    partitioning the input seismic traces into at least one trace data volume;
    scaling each input seismic trace in said data volume by the reciprocal of the local power in said trace to produce a scaler trace;
    scaling each input seismic trace by the corresponding scaler trace to produce a scaled trace;
    slant stacking in a direction at least two scaled traces and at least two scaler traces; and
    determining an output time-slope by dividing on a point by point basis at least one slant stack of the scaled traces by the slant stack of the scaler traces.

14. The method of claim 13 wherein the direction is further defined as a cross-line direction.

15. The method of claim 13 wherein the direction is further defined as an in-line direction.

16. The method of claim 10 further including the step of estimating trace dip ranges so as to generate a dip range data base.

17. The method of claim 16 further including the step of muting from the slope domain those portions of the product of step (b) not included in the dip range data base, and wherein the muted product of step (b) is transformed in step (c).

18. The method of claim 16 wherein the estimating step is further defined by estimating the dip range of the traces in a direction.

19. The method of claim 18 wherein the direction is further defined as a cross-line direction.

20. The method of claim 18 wherein the direction is further defined as an in-line direction.

* * * * *